(12) United States Patent
Butler (10) Patent No.: US 11,433,934 B2
(45) Date of Patent: Sep. 6, 2022

(54) MOTORIZED CART ASSEMBLY

(71) Applicant: Kimberly Butler, Hattiesburg, MS (US)

(72) Inventor: Kimberly Butler, Hattiesburg, MS (US)

( * ) Notice: Subject to any disclaimer, the term of this patent is extended or adjusted under 35 U.S.C. 154(b) by 64 days.

(21) Appl. No.: 16/892,505

(22) Filed: Jun. 4, 2020

(65) Prior Publication Data

US 2021/0380153 A1 Dec. 9, 2021

(51) Int. Cl.
*B62B 5/00* (2006.01)
*B62B 3/00* (2006.01)
*B62B 3/02* (2006.01)
*B62B 5/06* (2006.01)

(52) U.S. Cl.
CPC .......... *B62B 5/0076* (2013.01); *B62B 3/001* (2013.01); *B62B 3/005* (2013.01); *B62B 3/022* (2013.01); *B62B 5/0036* (2013.01); *B62B 5/0053* (2013.01); *B62B 5/06* (2013.01); *B62B 2205/30* (2013.01); *B62B 2206/06* (2013.01)

(58) Field of Classification Search
CPC ....... B62B 5/0076; B62B 5/06; B62B 5/0036; B62B 3/001; B62B 3/005; B62B 3/022; B62B 5/0053; B62B 2205/30; B62B 2206/06; B62B 3/027; B62B 3/102; B62B 2202/52; B62B 3/025; B62B 5/0026; B62B 2202/023; B62B 5/0013; B62B 9/147
See application file for complete search history.

(56) References Cited

U.S. PATENT DOCUMENTS

| 5,899,285 | A | * | 5/1999 | Curbelo | ................ | B62B 5/0026 |
| | | | | | | 280/DIG. 4 |
| 6,550,575 | B2 | | 4/2003 | Spencer | | |
| 7,128,364 | B2 | | 10/2006 | Stabile, Jr. | | |
| 7,210,545 | B1 | * | 5/2007 | Waid | .................... | B60K 7/0007 |
| | | | | | | 180/19.1 |
| 8,348,301 | B2 | | 1/2013 | Darling, III | | |
| 8,746,377 | B1 | * | 6/2014 | Dunbar | ................. | B62B 5/0003 |
| | | | | | | 180/19.2 |
| 9,616,908 | B2 | | 4/2017 | Brown | | |

(Continued)

FOREIGN PATENT DOCUMENTS

| CN | 109334738 | A | * | 2/2019 | ............... | B62B 3/02 |
| CN | 110077444 | A | * | 8/2019 | | |

(Continued)

OTHER PUBLICATIONS

Translated DE-202014102009-U1 (Year: 2021).*

*Primary Examiner* — James A Shriver, II
*Assistant Examiner* — Ian Bryce Shelton (57) ABSTRACT

A motorized cart assembly includes a cart that has a basket, a collapsible frame and a plurality of wheels. The basket has a height that is greater than a width of the basket to accommodate tent poles and a tent. The frame includes a pole support for insertably receiving a respective one of the tent poles to vertically orient the respective tent pole. A drive unit is coupled to the cart and the drive unit is in mechanical communication with respective ones of the wheels. The drive unit rotates the respective wheels when the drive unit is turned on thereby facilitating the cart to be self propelled. The drive unit is in wireless communication with a personal electronic device for remotely controlling the drive unit.

13 Claims, 6 Drawing Sheets

(56) References Cited

U.S. PATENT DOCUMENTS

| | | | |
|---|---|---|---|
| 9,643,638 B1* | 5/2017 | Wittliff, III | B62B 5/0033 |
| 9,796,402 B1* | 10/2017 | Suarez | B62B 5/065 |
| 10,040,470 B1* | 8/2018 | Horowitz | B62B 3/007 |
| 10,227,791 B2 | 3/2019 | Lindeman | |
| 10,864,932 B2* | 12/2020 | Darvish | B62B 3/025 |
| 10,919,555 B1* | 2/2021 | Spruill | B62B 3/1416 |
| 2006/0214383 A1* | 9/2006 | Yoh | B62B 3/027 |
| | | | 280/47.34 |
| 2012/0274052 A1* | 11/2012 | Zhu | B62B 3/027 |
| | | | 280/651 |
| 2013/0162396 A1* | 6/2013 | Yang | B62B 9/00 |
| | | | 340/5.81 |
| 2015/0144411 A1* | 5/2015 | Washington | B62B 5/0033 |
| | | | 180/167 |
| 2018/0334180 A1* | 11/2018 | Lambert | B62B 3/007 |
| 2019/0126966 A1* | 5/2019 | Griffith | B62B 5/0033 |
| 2020/0239054 A1* | 7/2020 | Darvish | B62B 3/025 |
| 2021/0009184 A1* | 1/2021 | Givens | B62B 9/087 |
| 2021/0129887 A1* | 5/2021 | Walker | B62B 9/142 |
| 2021/0179156 A1* | 6/2021 | Wu | B62B 3/027 |
| 2021/0218280 A1* | 7/2021 | Ogishima | H02J 50/005 |
| 2021/0284221 A1* | 9/2021 | Perez | B62B 3/022 |

FOREIGN PATENT DOCUMENTS

| | | | | |
|---|---|---|---|---|
| DE | 202014102009 U1 * | 5/2014 | | B62B 9/147 |
| GB | 2331490 A * | 5/1999 | | B62B 3/027 |
| KR | 200485017 Y1 * | 11/2017 | | |
| KR | 101850108 B1 * | 4/2018 | | |
| WO | WO2008101610 | 8/2008 | | |
| WO | WO-2019027161 A1 * | 2/2019 | | B62B 5/00 |
| WO | WO-2020222329 A1 * | 11/2020 | | B25J 9/16 |

* cited by examiner

MOTORIZED CART ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cart devices and more particularly pertains to a new cart device for transporting tent poles and a tent.

(2) Description of Related Art Including Information Disclosed Under 37 CFR 1.97 and 1.98.

The prior art relates to cart devices including a cart with an elevated seat for improving line of sight for a spectator. The prior art discloses a tent device that is positionable over a bed of a truck. The prior art discloses a variety of collapsible carts that includes storage boxes or storage baskets.

BRIEF SUMMARY OF THE INVENTION

An embodiment of the disclosure meets the needs presented above by generally comprising a cart that has a basket, a collapsible frame and a plurality of wheels. The basket has a height that is greater than a width of the basket to accommodate tent poles and a tent. The frame includes a pole support for insertably receiving a respective one of the tent poles to vertically orient the respective tent pole. A drive unit is coupled to the cart and the drive unit is in mechanical communication with respective ones of the wheels. The drive unit rotates the respective wheels when the drive unit is turned on thereby facilitating the cart to be self propelled. The drive unit is in wireless communication with a personal electronic device for remotely controlling the drive unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
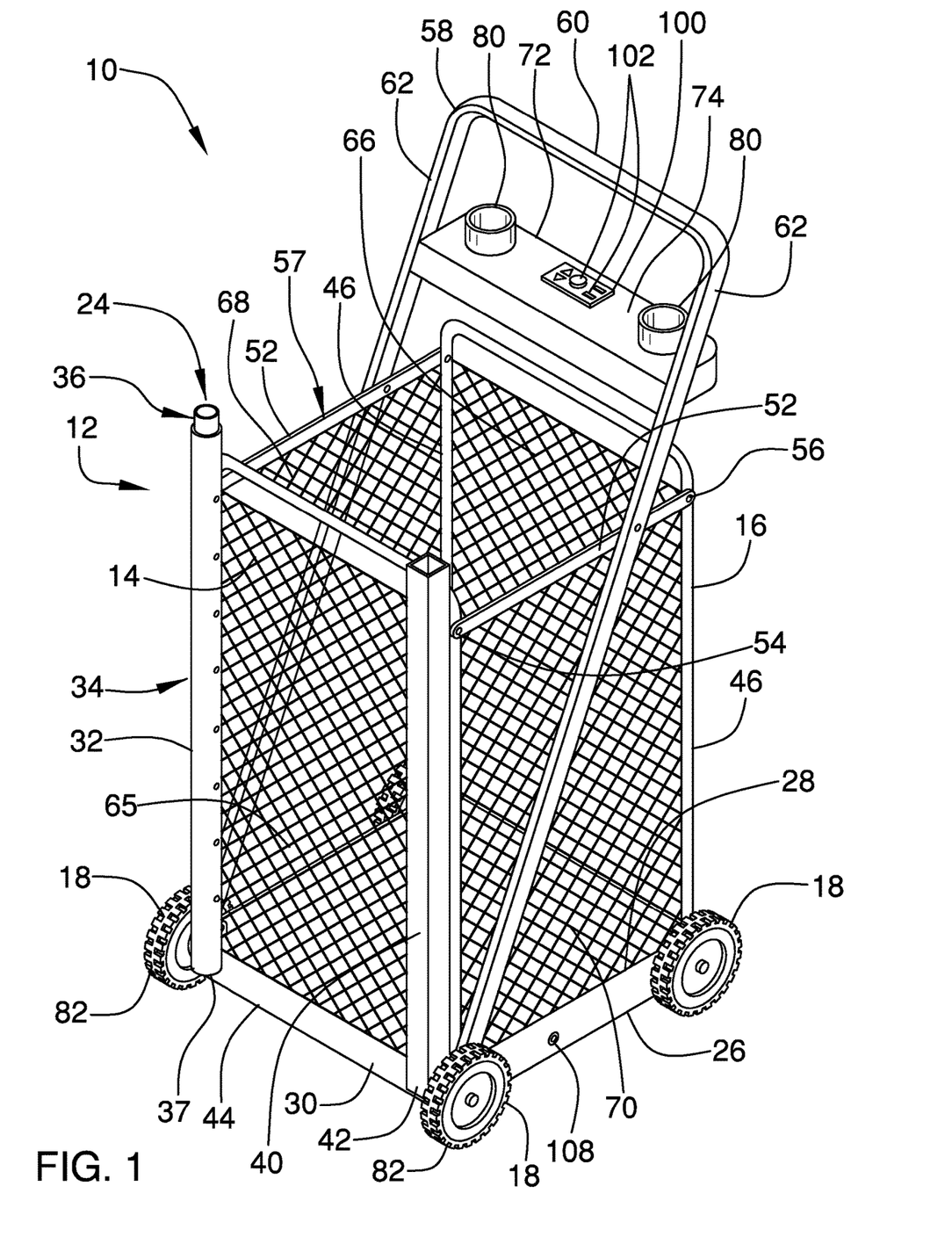
FIG. 1 is a front perspective view of a motorized cart assembly according to an embodiment of the disclosure.
Figure 2:
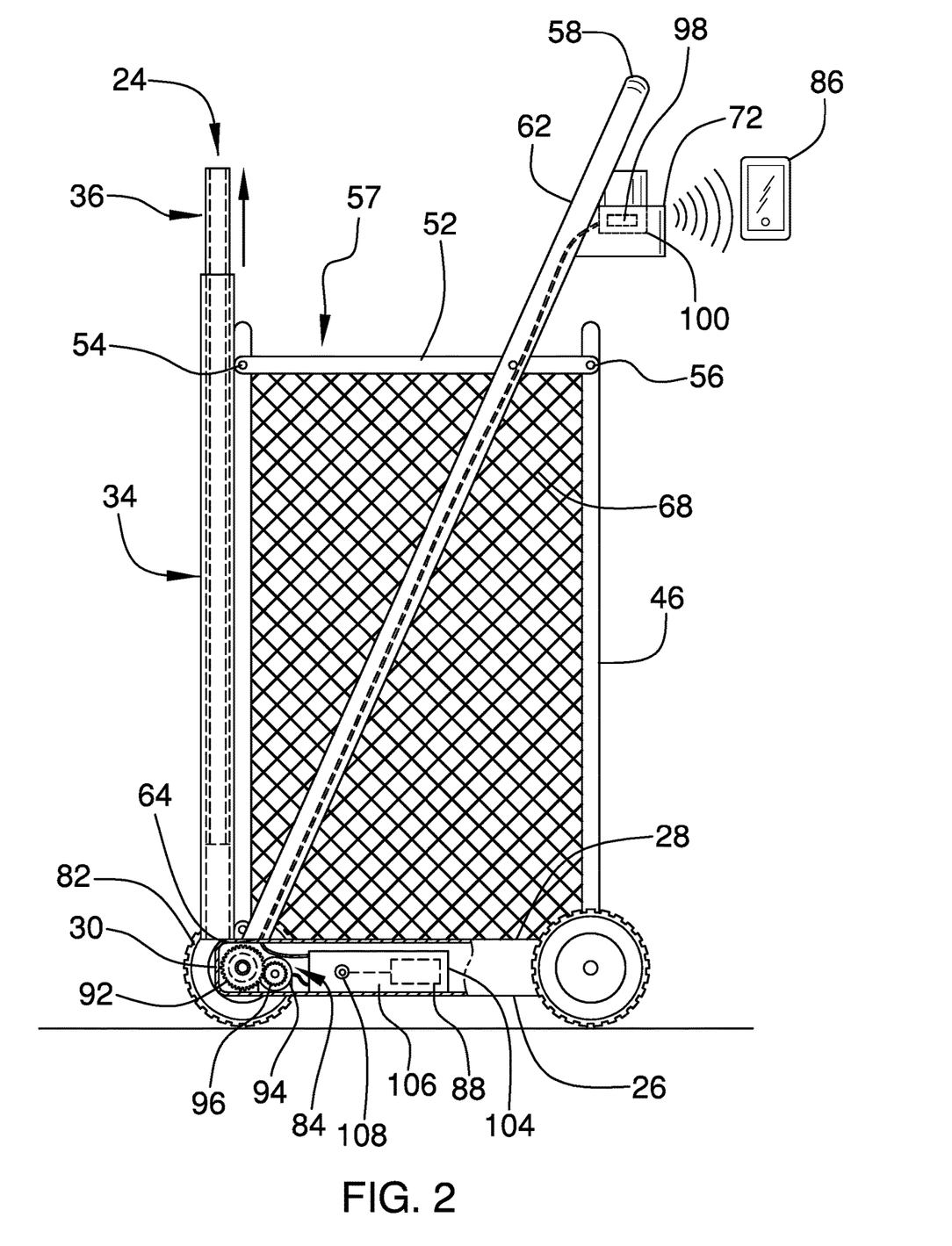
FIG. 2 is a left side phantom view of an embodiment of the disclosure.
Figure 3:
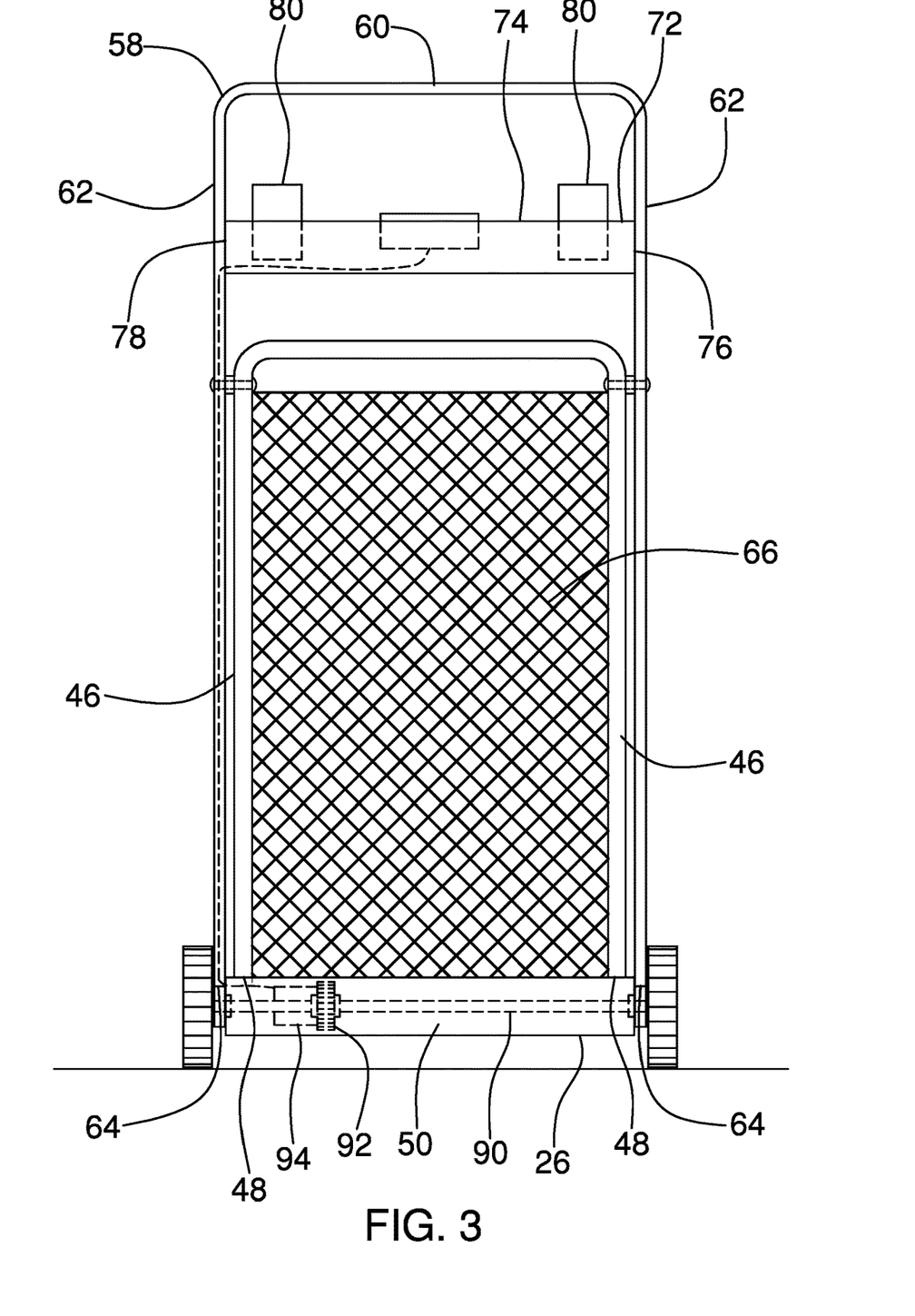
FIG. 3 is a back phantom view of an embodiment of the disclosure.
Figure 4:
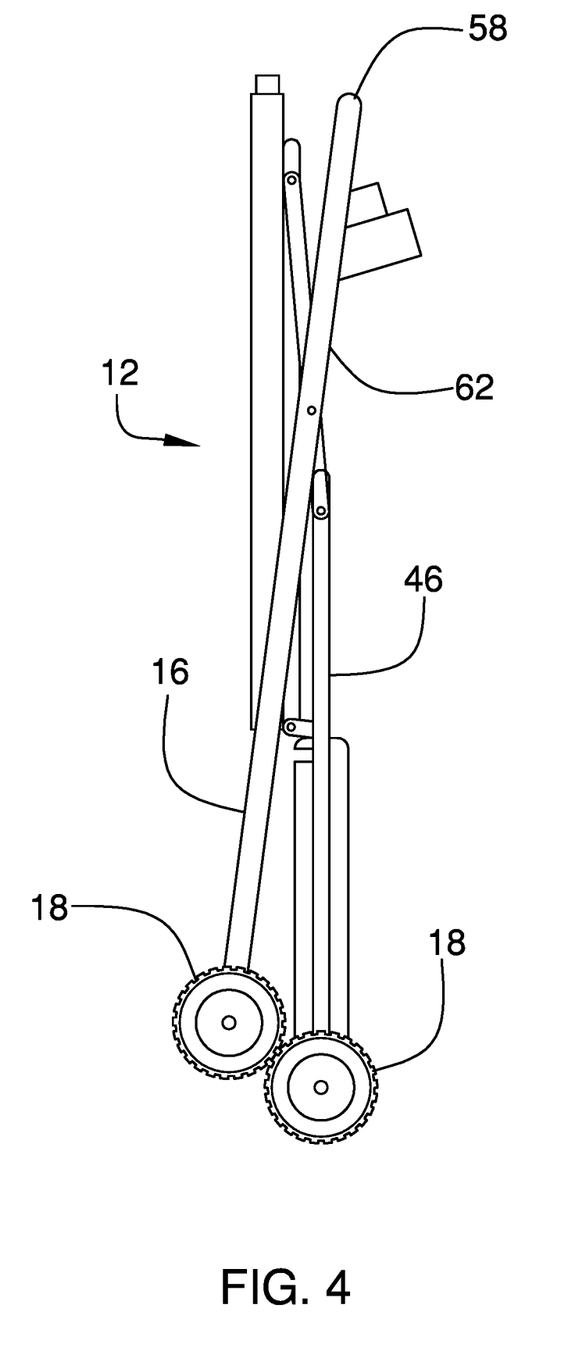
FIG. 4 is a left side view of an embodiment of the disclosure showing a collapsible frame in a collapsed position.
Figure 5:
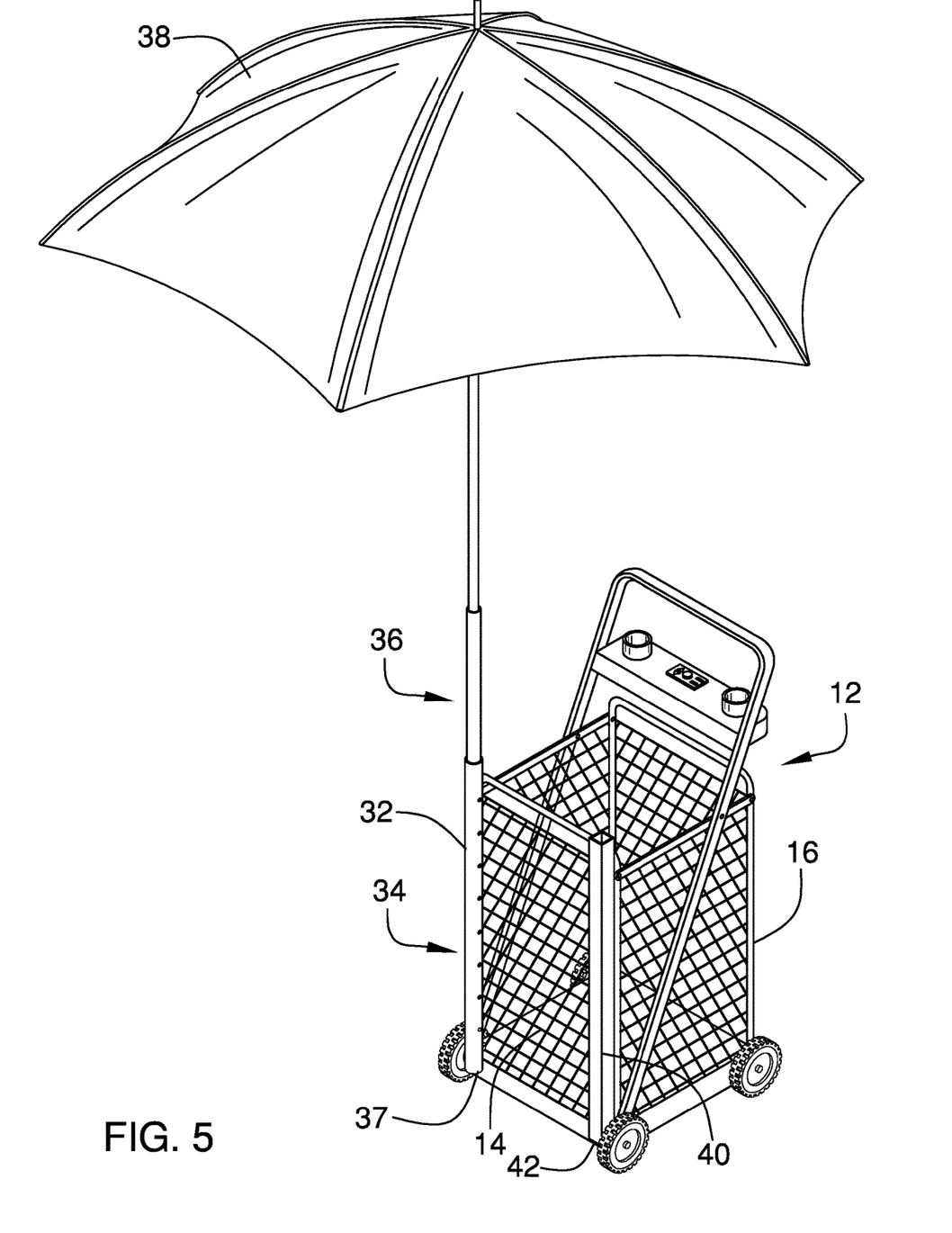
FIG. 5 is a perspective view of an embodiment of the disclosure showing an umbrella in a pole support.
Figure 6:
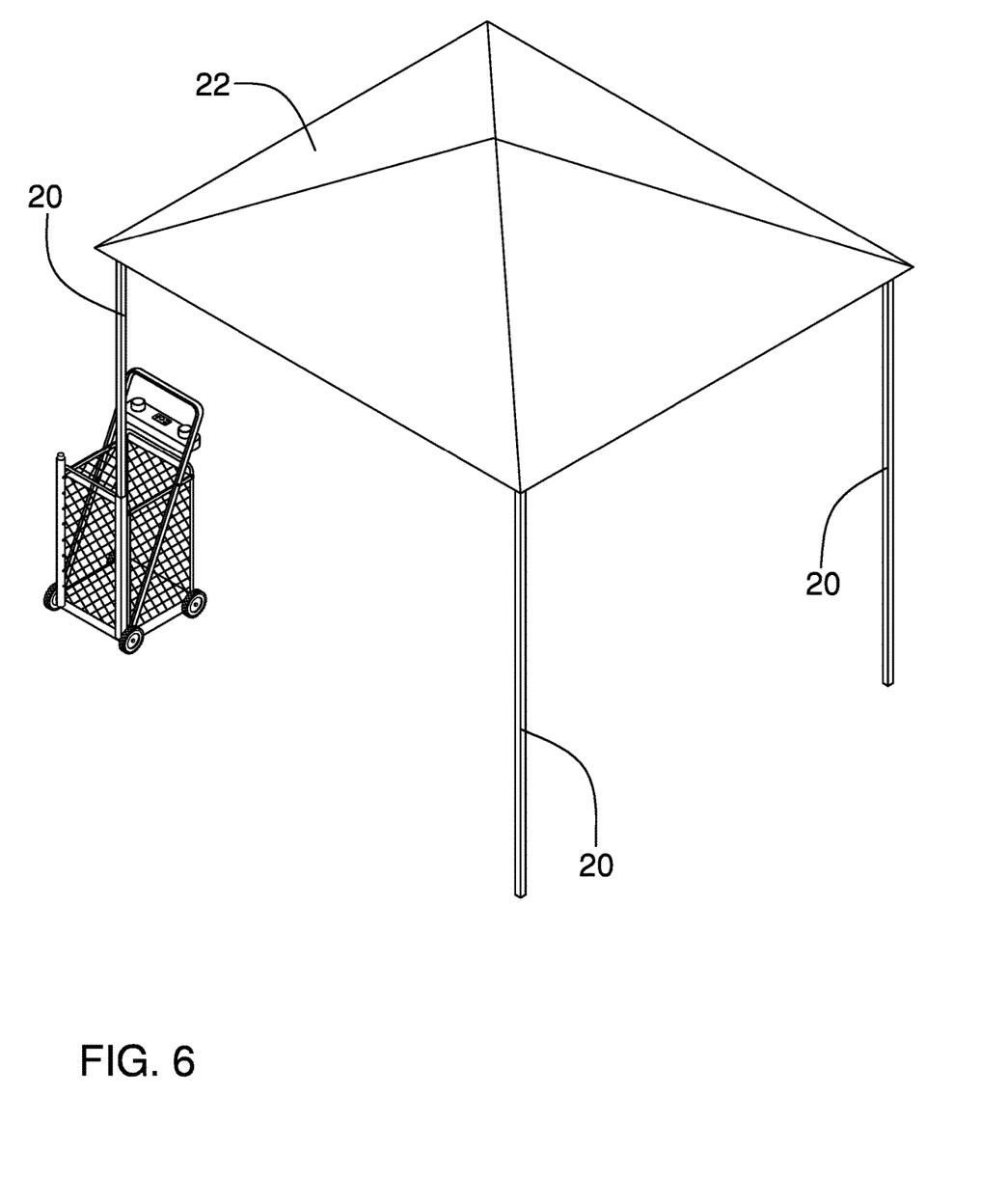
FIG. 6 is a perspective in-use view of an embodiment of the disclosure.

With reference now to the drawings, and in particular to FIGS. 1 through 6 thereof, a new cart device embodying the principles and concepts of an embodiment of the disclosure and generally designated by the reference numeral 10 will be described.

As best illustrated in FIGS. 1 through 6, the motorized cart assembly 10 generally comprises a cart 12 that has a basket 14, a collapsible frame 16 and a plurality of wheels 18. The basket 14 has a height that is greater than a width of the basket 14 thereby facilitating the basket 14 to accommodate tent poles 20 and a tent 22. The frame 16 includes a pole support 24 for insertably receiving a respective one of the tent poles 20 to vertically orient the respective tent pole 20.

The collapsible frame 16 comprises a base 26 that has an upper surface 28 and a perimeter edge 30 which has four corners such that the base 26 has a rectangular shape. The collapsible frame 16 includes a first tube 32 comprising a first section 34 slidably receiving a second section 36 such that the first tube 32 has a telescopically adjustable height. The first tube 32 is vertically oriented to insertably receive the respective tent pole 20. The first section 34 has a lower end 37 and the lower end 37 is movably coupled to a respective one of the four corners of the perimeter edge 30 of the base 26. As is most clearly shown in FIG. 5, an umbrella 38 may be provided that is insertable into the first tube 32 for shading the cart 12.

The collapsible frame 16 includes a second tube 40 that has a bottom end 42 and the bottom end 42 is movably coupled to a respective one of the four corners of the perimeter edge 30 of the base 26. Each of the first tube 32 and the second tube 40 is positioned on a front side 44 of the perimeter edge 30 of the base 26. As is most clearly shown in FIGS. 1 and 6, the second tube 40 may have a rectangular shape for accommodating a rectangular tent pole 20. The collapsible frame 16 includes a pair of rear members 46 and each of the rear members 46 has a bottom end 48. The bottom end 48 of each of the rear members 46 is movably coupled to a respective one of the four corners of the perimeter edge 30 of the base 26. Additionally, each of the rear members 46 is positioned on a rear side 50 of the perimeter edge 30 of the base 26.

The collapsible frame 16 includes a pair of side members 52 and each of the side members 52 has a first end 54 and a second end 56. The first end 54 of each of the side members 52 is pivotally coupled to a respective one of the first tube 32 and the second tube 40. The second end 56 of each of the side members 52 is pivotally coupled to a respective one of the rear members 46. Each of the side members 52 is spaced from the base 26 such that each of the side members 52 defines an upper threshold 57 of the basket 14.

The collapsible frame 16 includes a handle 58 that has a central member 60 extending between a pair of outward members 62. Each of the outward members 62 has a distal end 64 with respect to the central member 60 and the distal end 64 of each of the outward members 62 is pivotally coupled to the base 26. Additionally, the distal end 64 is positioned adjacent to a respective one of the first tube 32 and the second tube 40. Each of the outward members 62 is pivotally coupled to a respective one of the side members 52 having each of the outward members 62 angling rearwardly away from the first tube 32 and the second tube 40. The central member 60 is spaced upwardly from the upper threshold 57 the basket 14 such that the central member 60 can be gripped for pushing the cart 12.

The collapsible frame 16 is positionable in an unfolded position having each of the first tube 32, the second tube 40 and each of the rear members 46 extending along a line that is oriented perpendicular to the upper surface 28 of the base 26. Conversely, the frame 16 is positionable in a folded position having each of the rear members 46 being positioned adjacent to a respective one of the first tube 32 and the second tube 40. The basket 14 has a front side 65, a back side 66, a first lateral side 68 and a second lateral side 70. The front side 65 of the basket 14 extends between each of the first tube 32 and the second tube 40 and the back side 66 of the basket 14 extends between each of the rear members 46. The first lateral side 68 of the basket 14 extends between the first tube 32 and a respective one of the rear members 46 and the second lateral side 70 of the basket 14 extends between the second tube 40 and a respective one of the rear members 46. Additionally, the basket 14 extends upwardly from the upper surface 28 of the base 26.

A panel 72 is included that has a top side 74, a first lateral side 76 and a second lateral side 78. Each of the first lateral side 76 and the second lateral side 78 of the panel 72 is coupled to a respective one of the outward members 62 of the handle 58 having the top side 74 lying on a horizontal plane. A pair of cup holders 80 is each coupled to and extends upwardly from the top side 74 of the panel 72 to contain a beverage container. Each of the wheels 18 is rotatably coupled to the base 26 to roll along a support surface. Each of the wheels 18 is positioned on a respective one a first lateral side 76 and a second lateral side 78 of the perimeter edge 30 of the base 26. Additionally, the plurality of wheels 18 includes a pair of front wheels 82 that is each aligned with the front side 44 of the perimeter edge 30 of the base 26.

A drive unit 84 is coupled to the cart 12 and the drive unit 84 is in mechanical communication with respective ones of the wheels 18. The drive unit 84 rotates the respective wheels 18 when the drive unit 84 is turned on thereby facilitating the cart 12 to be self propelled. The drive unit 84 is in wireless communication with a personal electronic device 86. The drive unit 84 receives navigation data from the personal electronic device 86 thereby facilitating the drive unit 84 to be remotely controlled by the personal electronic device 86. The personal electronic device 86 may be a smart phone or other device that has wireless communication capabilities.

The drive unit 84 comprises a control circuit 88 that is coupled to the cart 12 and an axle 90 that is rotatably positioned within the base 26. Additionally, the axle 90 is coupled to each of the front wheels 18. The drive unit 84 includes an axle gear 92 that has the axle 90 extending therethrough and the drive unit 84 includes a motor 94 that is coupled to the cart 12 and the motor 94 is positioned within the base 26. The motor 94 rotates in a first direction or a second direction when the motor 94 is turned on, and the motor 94 is electrically coupled to the control circuit 88. The motor 94 may comprise an electric motor or the like. A drive gear 96 is coupled to the motor 94 such that the motor 94 rotates the drive gear 96 when the motor 94 is turned on. The drive gear 96 engages the axle gear 92 such that the motor 94 rotates each of the front wheels 18 when the motor 94 is turned on.

The drive unit 84 includes a transceiver 98 that is coupled to the cart 12 and the transceiver 98 is electrically coupled to the control circuit 88. The transceiver 98 is in wireless communication with the personal electronic device 86 for receiving the navigation data from the personal electronic device 86. In this way the drive unit 84 can be remotely controlled by the personal electronic device 86. The transceiver 98 may comprise a radio frequency transceiver or the like and the transceiver 98 may employ Bluetooth communication protocols. A control panel 100 is coupled to the top side 74 of the panel 72 that is coupled to the handle 58 and the control panel 100 is electrically coupled to the control circuit 88. The control panel 100 includes a plurality of buttons 102 for controlling operational parameters of the drive unit 84 including power on, forward, reverse and speed.

The drive unit 84 includes a power supply 104 that is coupled to the cart 12 and the power supply 104 is electrically coupled to the control circuit 88. The power supply 104 comprises at least one rechargeable battery 106 that is electrically coupled to the control circuit 88. A charge port 108 is coupled to the cart 12 to receive a charge cord from a power source. The charge port 108 is electrically coupled to the at least one rechargeable battery 106 for charging the at least one rechargeable battery 106.

In use, the tent poles 20, tent 22 and any other objects are stored in the basket 14 for transportation to a remote location, such as an outdoor sporting event, for example. The drive unit 84 is turned on to propel the cart 12 without requiring a user to push the cart 12. Additionally, the personal electronic device 86 can be synched with the transceiver 98 to facilitate the personal electronic device 86 to remotely control the cart 12. Additionally, a respective one of the tent poles 20 can be inserted into the second tube 40 when the tent 22 is assembled for anchoring the tent 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A motorized cart assembly for transporting a tent and associated hardware, said assembly comprising:
   a cart having a basket, a collapsible frame and a plurality of wheels, said basket having a height being greater than a width of said basket wherein said basket is configured to accommodate tent poles and a tent, said frame including a pole support for insertably receiving a respective one of the tent poles wherein said pole support is configured to vertically orient the respective tent pole;
   a drive unit being coupled to said cart, said drive unit being in mechanical communication with respective ones of said plurality of wheels, said drive unit rotating said respective plurality of wheels when said drive unit is turned on thereby facilitating said cart to be self propelled, said drive unit being in wireless communication with a personal electronic device, said drive unit receiving navigation data from the personal electronic device wherein said drive unit is configured to be remotely controlled by the personal electronic device;
   wherein said collapsible frame comprises
      a base having an upper surface and a perimeter edge having four corners such that said base has a rectangular shape,
      a first tube comprising a first section slidably receiving a second section such that said first tube has a telescopically adjustable height, said first tube being vertically oriented wherein said first tube is configured to insertably receive the respective tent pole, said first section having a lower end, said lower end being movably coupled to a respective one of said four corners of said perimeter edge of said base, and
      a second tube having a bottom end, said bottom end being movably coupled to a respective one of said four corners of said perimeter edge of said base, each of said first tube and said second tube being positioned on a front side of said perimeter edge of said base; and
   wherein each of said wheels of said plurality of wheels is rotatably coupled to said base wherein each of said wheels of said plurality of wheels is configured to roll along a support surface, each of said wheels of said plurality of wheels being positioned on a respective one a first lateral side and a second lateral side of said perimeter edge of said base, said plurality of wheels including a pair of front wheels each being aligned with said front side of said perimeter edge of said base.

2. The assembly according to claim 1, wherein said frame comprises:
   a pair of rear members, each of said rear members having a bottom end, said bottom end of each of said rear members being movably coupled to a respective one of said four corners of said perimeter edge of said base, each of said rear members being positioned on a rear side of said perimeter edge of said base;
   a pair of side members, each of said side members having a first end and a second end, said first end of each of said side members being pivotally coupled to a respective one of said first tube and said second tube, said second end of each of said side members being pivotally coupled to a respective one of said rear members, each of said side members being spaced from said base such that each of said side members defines an upper threshold of said basket.

3. A motorized cart assembly for transporting a tent and associated hardware, said assembly comprising:
   a cart having a basket, a collapsible frame and a plurality of wheels, said basket having a height being greater than a width of said basket wherein said basket is configured to accommodate tent poles and a tent, said frame including a pole support for insertably receiving a respective one of the tent poles wherein said pole support is configured to vertically orient the respective tent pole;
   a drive unit being coupled to said cart, said drive unit being in mechanical communication with respective ones of said plurality of wheels, said drive unit rotating said respective plurality of wheels when said drive unit is turned on thereby facilitating said cart to be self propelled, said drive unit being in wireless communication with a personal electronic device, said drive unit receiving navigation data from the personal electronic device wherein said drive unit is configured to be remotely controlled by the personal electronic device;
   wherein said collapsible frame comprises
      a base having an upper surface and a perimeter edge having four corners such that said base has a rectangular shape,
      a first tube comprising a first section slidably receiving a second section such that said first tube has a telescopically adjustable height, said first tube being vertically oriented wherein said first tube is configured to insertably receive the respective tent pole, said first section having a lower end, said lower end being movably coupled to a respective one of said four corners of said perimeter edge of said base,
      a second tube having a bottom end, said bottom end being movably coupled to a respective one of said four corners of said perimeter edge of said base, each of said first tube and said second tube being positioned on a front side of said perimeter edge of said base,
      a pair of rear members, each of said rear members having a bottom end, said bottom end of each of said rear members being movably coupled to a respective one of said four corners of said perimeter edge of said base, each of said rear members being positioned on a rear side of said perimeter edge of said base,
      a pair of side members, each of said side members having a first end and a second end, said first end of each of said side members being pivotally coupled to a respective one of said first tube and said second tube, said second end of each of said side members being pivotally coupled to a respective one of said rear members, each of said side members being spaced from said base such that each of said side members defines an upper threshold of said basket; and wherein said cart comprises a handle having a central member extending between a pair of outward members, each of said outward members having a distal end with respect to said central member, said distal end of each of said outward members being pivotally coupled to said base having said distal end being positioned adjacent to a respective one of said first tube and said second tube, each of said outward members being pivotally coupled to a respective one of said side members having each of said outward members angling rearwardly away from said first tube and said second tube, said central member being spaced upwardly from said upper threshold of said basket wherein said central member is configured to be gripped for pushing said cart.

4. The assembly according to claim 2, further comprising wherein said frame is positionable in an unfolded position having each of said first tube, said second tube and each of said rear members extending along a line being oriented perpendicular to said upper surface of said base, said frame being positionable in a folded position having each of said rear members being positioned adjacent to a respective one of said first tube and said second tube.

5. The assembly according to claim 2, wherein said basket has a front side, a back side, a first lateral side and a second lateral side, said front side extending between each of said first tube and said second tube, said back side extending between each of said rear members, said first lateral side extending between said first tube and a respective one of said rear members, said second lateral side extending between said second tube and a respective one of said rear members, said basket extending upwardly from said upper surface of said base.

6. The assembly according to claim 3, further comprising a panel having a top side, a first lateral side and a second lateral side, each of said first lateral side and said second lateral side of said panel being coupled to a respective one of said outward members of said handle having said top side lying on a horizontal plane.

7. The assembly according to claim 6, further comprising a pair of cup holders, each of said cup holders being coupled to and extending upwardly from said top side of said panel wherein each of cup holders is configured to contain a beverage container.

8. The assembly according to claim 1, wherein said drive unit comprises:
a control circuit being coupled to said cart; and
a motor being coupled to said cart, said motor being positioned within said cart, said motor rotating in a first direction or a second direction when said motor is turned on, said motor being electrically coupled to said control circuit.

9. The assembly according to claim 8, wherein said drive unit includes:
an axle being rotatably positioned within said cart, said axle being coupled to each of the pair of front wheels of said plurality of wheels;
an axle gear having said axle extending therethrough; and
a drive gear being coupled to said motor such that said motor rotates said drive gear when said motor is turned on, said drive gear engaging said axle gear such that said motor rotates each of said front wheels when said motor is turned on.

10. The assembly according to claim 8, wherein said drive unit includes a transceiver being coupled to said cart, said transceiver being electrically coupled to said control circuit, said transceiver being in wireless communication with the personal electronic device for receiving the navigation data from the personal electronic device wherein said drive unit is configured to be remotely controlled by the personal electronic device.

11. The assembly according to claim 8, wherein said drive unit includes a control panel being coupled to a top side of a panel that is coupled to a handle, said control panel being electrically coupled to said control circuit, said control panel including a plurality of buttons for controlling operational parameters of said drive unit including power on, forward, reverse and speed.

12. The assembly according to claim 8, wherein said drive unit comprises a power supply being coupled to said cart, said power supply being electrically coupled to said control circuit, said power supply comprising:
at least one rechargeable battery being electrically coupled to said control circuit; and
a charge port being coupled to said cart wherein said charge port is configured to receive a charge cord from a power source, said charge port being electrically coupled to said at least one rechargeable battery for charging said at least one rechargeable battery.

13. A motorized cart assembly for transporting a tent and associated hardware, said assembly comprising:
a cart having a basket, a collapsible frame and a plurality of wheels, said basket having a height being greater than a width of said basket wherein said basket is configured to accommodate tent poles and a tent, said frame including a pole support for insertably receiving a respective one of the tent poles wherein said pole support is configured to vertically orient the respective tent pole, said collapsible frame comprising:
a base having an upper surface and a perimeter edge having four corners such that said base has a rectangular shape;
a first tube comprising a first section slidably receiving a second section such that said first tube has a telescopically adjustable height, said first tube being vertically oriented, said first tube defining said pole support wherein said first tube is configured to insertably receive the respective tent pole, said first section having a lower end, said lower end being movably coupled to a respective one of said four corners of said perimeter edge of said base;
a second tube having a bottom end, said bottom end being movably coupled to a respective one of said four corners of said perimeter edge of said base, each of said first tube and said second tube being positioned on a front side of said perimeter edge of said base;
a pair of rear members, each of said rear members having a bottom end, said bottom end of each of said rear members being movably coupled to a respective one of said four corners of said perimeter edge of said base, each of said rear members being positioned on a rear side of said perimeter edge of said base;
a pair of side members, each of said side members having a first end and a second end, said first end of each of said side members being pivotally coupled to a respective one of said first tube and said second tube, said second end of each of said members being pivotally coupled to a respective one of said rear members, each of said side members being spaced from said base such that each of said side members defines an upper threshold of said basket; and a handle having a central member extending between a pair of outward members, each of said outward members having a distal end with respect to said central member, said distal end of each of said outward members being pivotally coupled to said base having said distal end being positioned adjacent to a respective one of said first tube and said second tube, each of said outward members being pivotally coupled to a respective one of said side members having each of said outward members angling rearwardly away from said first tube and said second tube, said central member being spaced upwardly from said upper threshold of said basket wherein said central member is configured to be gripped for pushing said cart;

wherein said frame is positionable in an unfolded position having each of said first tube, said second tube and each of said rear members extending along a line being oriented perpendicular to said upper surface of said base, said frame being positionable in a folded position having each of said rear members being positioned adjacent to a respective one of said first tube and said second tube;

said basket having a front side, a back side, a first lateral side and a second lateral side, said front side extending between each of said first tube and said second tube, said back side extending between each of said rear members, said first lateral side extending between said first tube and a respective one of said rear members, said second lateral side extending between said second tube and a respective one of said rear members, said basket extending upwardly from said upper surface of said base;

a panel having a top side, a first lateral side and a second lateral side, each of said first lateral side and said second lateral side of said panel being coupled to a respective one of said outward members of said handle having said top side lying on a horizontal plane;

a pair of cup holders, each of said cup holders being coupled to and extending upwardly from said top side of said panel wherein each of cup holders is configured to contain a beverage container;

each of said plurality of wheels being rotatably coupled to said base wherein each of said wheels is configured to roll along a support surface, each of said wheels being positioned on a respective one a first lateral side and a second lateral side of said perimeter edge of said base, said plurality of wheels including a pair of front wheels each being aligned with said front side of said perimeter edge of said base; and a drive unit being coupled to said cart, said drive unit being in mechanical communication with respective ones of said wheels, said drive unit rotating said respective wheels of said plurality of wheels when said drive unit is turned on thereby facilitating said cart to be self propelled, said drive unit being in wireless communication with a personal electronic device, said drive unit receiving navigation data from the personal electronic device wherein said drive unit is configured to travel along a pre-determined route, said drive unit comprising:

a control circuit being coupled to said cart;

an axle being rotatably positioned within said base, said axle being coupled to each of said front wheels;

an axle gear having said axle extending therethrough;

a motor being coupled to said cart, said motor being positioned within said base, said motor rotating in a first direction or a second direction when said motor is turned on, said motor being electrically coupled. to said control circuit;

a drive gear being coupled to said motor such that said motor rotates said drive gear when said motor is turned on, said drive gear engaging said axle gear such that said motor rotates each of said front wheels when said motor is turned on;

a transceiver being coupled to said cart, said transceiver being electrically coupled to said control circuit, said transceiver being in wireless communication with the personal electronic device for receiving the navigation data from the personal electronic device wherein said drive unit is configured to be remotely controlled by the personal electronic device;

a control panel being coupled to said top side of said panel that is coupled to said handle, said control panel being electrically coupled to said control circuit, said control panel including a plurality of buttons for controlling operational parameters of said drive unit, including power on, forward, reverse and speed; and a power supply being coupled to said cart, said power supply being electrically coupled to said control circuit, said power supply comprising:

at least one rechargeable battery being electrically coupled to said control circuit; and a charge port being coupled to said cart wherein said charge port is configured to receive a charge cord from a power source, said charge port being electrically coupled to said at least one rechargeable battery for charging said at least one rechargeable battery.

* * * * *